United States Patent Office 2,872,478
Patented Feb. 3, 1959

2,872,478

SEPARATION OF ALCOHOLS FROM ESTERS

Harry Wechsler, Leominster, Philip Bernstein, Fitchburg, and Ralph L. Herbst, Worcester, Mass., assignors to The Borden Company a corporation of New Jersey No Drawing. Application November 6, 1956
Serial No. 620,584

1 Claim. (Cl. 260—499)

This invention relates to a process of separating water soluble alcohols from low boiling esters. It is particularly useful in connection with the separation of methanol from methyl acetate in a mixture such as obtained in the manufacture of polyvinyl alcohol from polyvinyl acetate. The invention will be first illustrated, therefore, by description in connection with such separation.

Separations of alcohols from esters are commonly effected or at least attempted by fractionation. The closeness of the boiling points, formation of azeotropic mixtures, or other complications frequently introduce difficulties that make necessary the use of some procedure other than simple fractionation.

The present invention provides an effective and economical means of making such separations as methanol from methyl acetate without fractionating large amounts of them from each other.

The invention comprises diluting a mixture of a water soluble alcohol and an ester with a water immiscible organic liquid that is a solvent for the mixed alcohol and ester but is a non-solvent (i. e., no or poor solvent) for the alcohol in hydrous condition, contacting the diluted mixture wtih water so as to give extraction, and separating the resulting aqueous extract, by difference of specific gravity, from the resulting extracted organic phase consisting largely of the ester and the said solvent.

It is significant that the extraction of the alcohol from the mixture by water, with satisfactory separation from the ester, requires introducing initially an organic liquid which is itself a solvent for anhydrous alcohol as well as the ester.

As to materials used, the ester is one boiling at atmospheric pressure at a temperature below about 140° C. There is no great difficulty in effecting reasonably satisfactory separation of esters of higher boiling point from any water soluble alcohol with which the esters are commonly associated in commercial mixtures. Examples of esters that meet these requirements and that may be used are the ethyl, methyl, and iso- or n-propyl esters of formic, acetic, propionic, acrylic, methacrylic, and carbonic acids.

Examples of the alcohols that may be separated from mixtures with the esters, by the process of this invention, are the water soluble monohydric alcohols such as methyl, ethyl, iso- or n-propyl, and tertiary butyl.

We have found no water immiscible liquid solvent that is better, for use with the alcohol and ester mixture to be separated, than a chlorinated hydrocarbon. Examples illustrating this class of materials that may be used are any liquid chlorinated aliphatic $C_1$-$C_{10}$ hydrocarbon that is soluble in all proportions in the ester to be separated. Examples are dichloropentane, trichloropentane, perchlorethylene, carbon tetrachloride, or 1, 2 or 1, 3 dichlorobenzene, all of which have densities substantially greater than 1. The choice of the chlorinated hydrocarbon, from within the general class described, varies somewhat with the boiling point of the ester that is to be separated from the alcohol. A wide divergence, such as 30° C. or more, between the boiling points of the ester and the solvent facilitates the final distillation of one away from the other. When the ester to be separated is of about the boiling temperature of methyl acetate, we use to advantage any one of the dichloropentanes.

Water is employed in all of the separations as the medium to extract the water soluble alcohol, which then separates as an aqueous phase from the phase including the ester in the liquid organic solvent such as the chlorinated hydrocarbon.

As to proportions, the proportion of the alcohol to the ester is controlled by the composition of the available mixture which requires the separation. Examples are 25–27 parts of the water soluble alcohol for 100 of the mixture with the ester.

The proportion of the chlorinated hydrocarbon liquid or of water to be used varies with the closeness to perfection that is required in the extraction. Ordinarily we use at least approximately half as much of the chlorinated hydrocarbon as there is ester in the mixture to be separated and at least half as much water as alcohol. For best results the proportions of the chlorinated hydrocarbon or of water vary from 1–5 parts separately for 1 part of the ester or alcohol, respectively.

It is understood that the chlorinated hydrocarbon and the water used may be and for best results are introduced in several successive portions or in small increments in accordance with usual extraction technique. The first portion of the chlorinated hydrocarbon is ordinarily at least half that of the ester and the first portion of the water at least half that of the alcohol to be separated.

In general, the method includes thorough mixing or otherwise intimately contacting the alcohol and ester mixture to be separated with the organic solvent such as chlorinated hydrocarbon and with water, the solvent and water being used in proportions adequate to cause, first, formation of aqueous and organic solvent phases and then good parting of the two phases on standing or centrifuging. The two phases are then separated by difference of specific gravities, as by being drained one from the other. The separated organic solvent phase (including most of the ester and some methanol and water) is then washed thoroughly, that is, extracted with several portions of water, separation of the resulting two phases being effected by difference of specific gravities as stated after each washing or extraction. Likewise the original aqueous phase (the one first separated and containing most of the methanol and water with some ester and a little of the organic solvent) is washed with several portions of the organic solvent by being mixed thoroughly with the said portions and the two phases being separated, again by difference of specific gravities, after mixing with each of the said portions and allowing the resulting mixture to stand until two layers form.

Finally all the aqueous phases are combined with each other and fractionated to recover methanol. The fraction boiling at about 63°–66° C. is accepted as methanol that is usable, for example, in the manufacture of polyvinyl alcohol from polyvinyl acetate.

Likewise, the organic layers or phases obtained and separated as described are combined with each other and then fractionated to recover methyl acetate, the fraction coming over at about 55°–59° C. at 760 mm. being accepted as commercial methyl acetate. The organic solvent such as the chlorinated hydrocarbon will also be recovered in this distillation in form for reuse, either as a foreshot or as a still residue.

The equipment used in the extractions, separations by difference of specific gravities, and fractionations is conventional and is, therefore, not illustrated. Temperatures of extractions and said separations are suitably ambient.

The invention will be further illustrated by description in connection with the following specific examples of the practice of it. Proportions are expressed, here and elsewhere herein, as parts by weight unless specifically stated to the contrary.

Example 1

100 parts of a methanol and methyl acetate mixture containing 56% of methyl acetate and approximately 44% of methanol were mixed thoroughly with approximately 50 parts each of water and dichloropentane. After a few minutes of the mixing, the organic phase was drawn off.

The remaining aqueous phase was extracted with 3 additional portions (55 parts each) of the chlorinated pentane, the resulting organic phase being separated after each extraction.

All of the organic layers so separated and containing the major part of the ester of the original mixture, the chlorinated solvent, only a small amount of methanol and still less water were combined. The combined material was then washed with 3 successive portions of water of 50 parts each. Then the washed organic phase dried in any conventional manner, in this case by contact with anhydrous magnesium sulfate, was subjected to fractionation, to separate the chlorinated hydrocarbon from the ester and any methanol present. This fractionation proceeded smoothly and easily. It gave a methyl acetate distillate, 60% of the total ester used coming over at 57°–58° C.

Fractionation of the combined aqueous layers gave a small foreshot of an azeotrope containing 82% methyl acetate to 18% methanol, a large intermediate fraction containing 96.5% methanol to 3.5% methyl acetate, a water-methanol mixture, and substantially pure methanol. 44% of the total methanol used came over between 64° and 68° C.

The various foreshots and fractions above the main ones (representing methanol or its acetate) are used as such, as sources of methyl alcohol or methyl acetate, or are returned to the next batch of alcohol and acetate mixture to be separated.

Example 2

The procedure of Example 1 is followed with the exception that the methanol there used is replaced by any of the other water soluble alcohols shown herein, the ester by any of the other esters, and the dichloropentane by any one of the other water immiscible solvents described, all on an equal weight basis.

The process of the examples represents a multiple-batch extraction operation. A continuous procedure may be used, however, such as continuous extraction in centrifugal extraction in the "Podbielniak extractor" or in extraction towers, all of which equipment is conventional and, therefore, is not illustrated.

It is to be understood also that it is intended to cover all changes and modifications of the examples of the invention herein chosen for the purpose of illustration which do not constitute departures from the spirit and scope of the invention.

What is claimed is:

In separating an alcohol that is infinitely soluble in water selected from the group consisting of methyl, ethyl, isopropyl, and n-propyl alcohols from an ester, of higher specific gravity, of the said alcohol with an acid selected from the group consisting of formic, acetic, propionic, acrylic, methacrylic, and carbonic acids, the ester having a boiling point below 140° C., the process which comprises contacting a mixture of the said alcohol and ester with (1) a water immiscible liquid chlorinated hydrocarbon of density greater than 1 that is a solvent for the ester, is a solvent for the alcohol in anhydrous condition, and forms two layers when in contact with a solution of the said alcohol in at least half its weight of water, the said hydrocarbon being present in amount at least approximately equal to half that of the said ester, and at the same time with (2) water in amount at least equal to approximately half of the said alcohol, maintaining contact of the said mixture with the chlorinated hydrocarbon and with the water until the chlorinated hydrocarbon dissolves and an aqueous phase separates, then separating the aqueous phase from the remaining water-extracted ester and chlorinated hydrocarbon phase, subsequently extracting the separated aqueous phase with an additional portion of the chlorinated hydrocarbon and separating the resulting additional ester phase from the thus re-extracted aqueous phase, extracting the said additional ester phase with an additional portion of water, separating the resulting additional aqueous phase from the said additional ester phase, distilling the separated aqueous phases to recover methanol therefrom, and distilling the separated ester phases to recover ester and chlorinated hydrocarbon therefrom, all the said separations being effected by difference of specific gravity of the layers being separated.

References Cited in the file of this patent

UNITED STATES PATENTS

| | | |
|---|---|---|
| 1,541,430 | Mann | June 9, 1925 |
| 2,251,215 | Tindall | July 29, 1941 |
| 2,636,050 | Hoaglin et al. | Apr. 21, 1953 |

OTHER REFERENCES

Craig et al.: "Technique of Organic Chemistry," vol. III (Interscience Publishers, Inc., 1950), pp. 295–7.